L. E. SHERMAN.
AUTO TOP.
APPLICATION FILED JUNE 8, 1916.
1,245,278.
Patented Nov. 6, 1917.
2 SHEETS—SHEET 2.
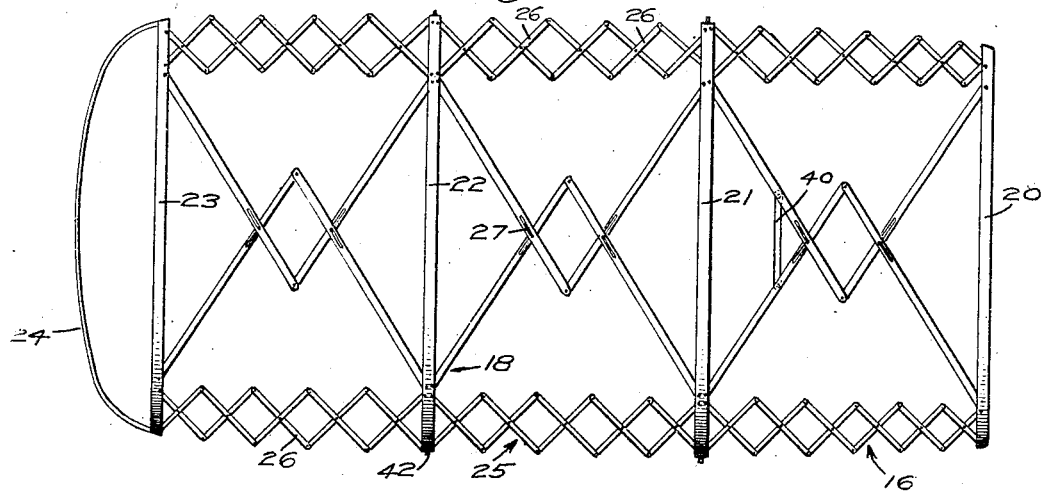
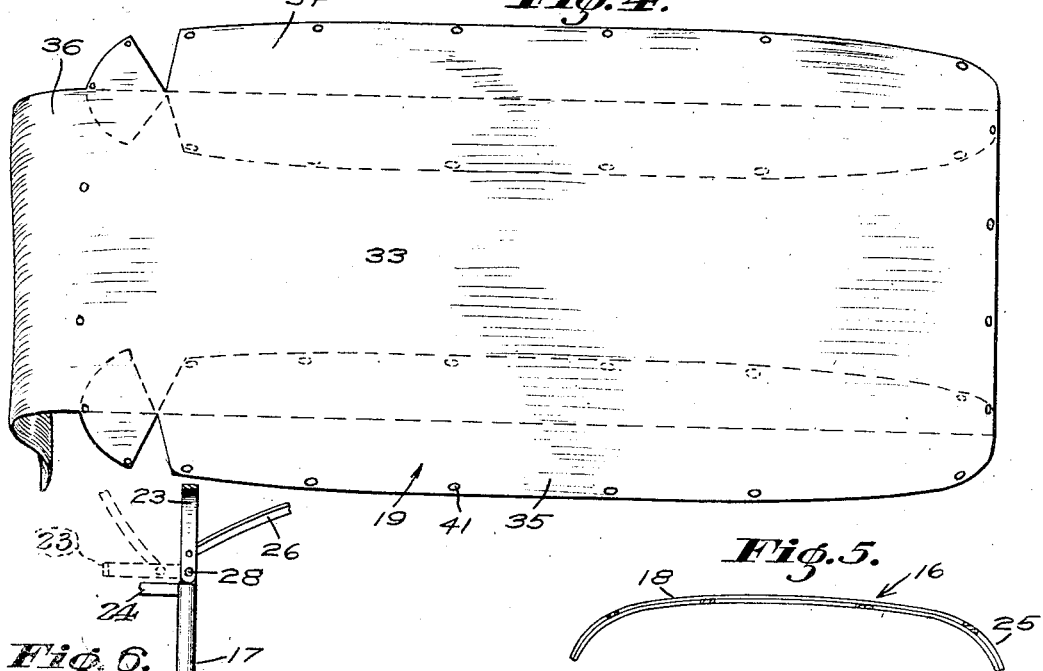
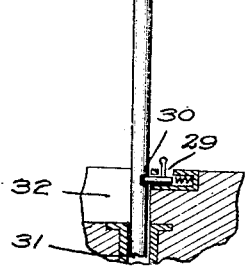
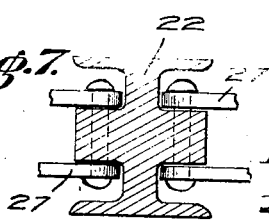
INVENTOR
Lora E. Sherman.
BY
ATTORNEYS.

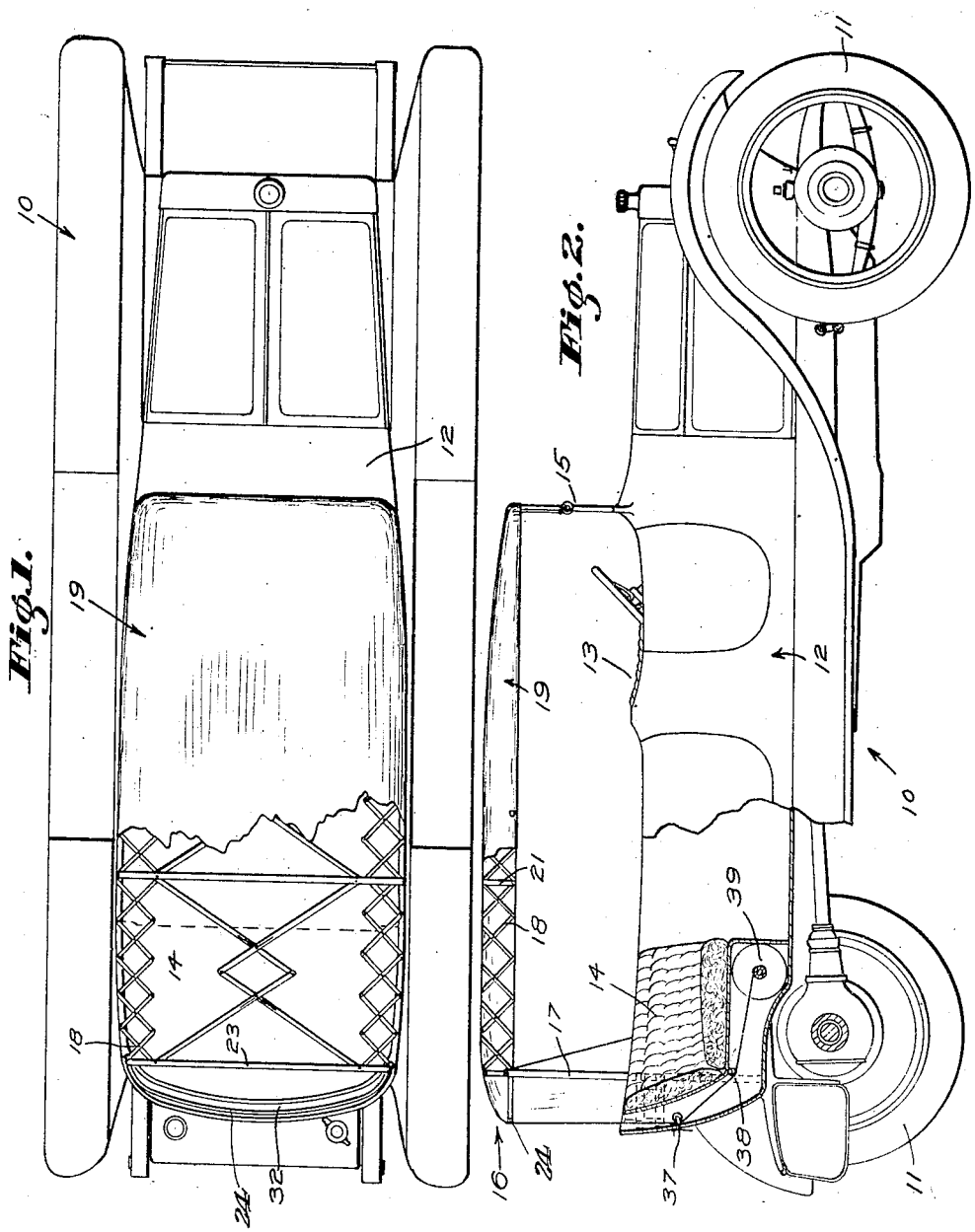

UNITED STATES PATENT OFFICE.

LORA E. SHERMAN, OF PASADENA, CALIFORNIA.

AUTO-TOP.

1,245,278.

Specification of Letters Patent.

Patented Nov. 6, 1917.

Application filed June 8, 1916. Serial No. 102,477.

*To all whom it may concern:*

Be it known that I, LORA E. SHERMAN, a citizen of the United States, residing at Pasadena, in the county of Los Angeles and State of California, have invented new and useful Improvements in Auto-Tops, of which the following is a specification.

This invention relates to a top or canopy for vehicles and particularly pertains to a disappearing top construction adapted for use upon automobiles.

It is an object of this invention to provide an improved automobile top which may be positioned over an automobile and which may be readily taken down and concealed from view when not in use.

Another object of this invention is to provide an improved collapsible top frame construction by which the top is supported, said frame being so made as to be readily folded and positioned in a concealed manner within the automobile body.

Another object is to provide the fabric top portion with improved means whereby it may be readily rolled beneath the seat of the automobile and in a manner to allow it to be quickly drawn therefrom and stretched over the collapsible supporting frame.

Another object is to provide means whereby the rear supporting standards with a collapsible top may be telescoped within the automobile body when the top is not in use.

Other objects will appear hereinafter.

The invention is illustrated in the accompanying drawings in which:

Figure 1 is a plan view of an automobile showing it fitted with the special top construction and illustrating it with a portion of the fabric top broken away to more clearly disclose the frame therebeneath.

Fig. 2 is a view in side elevation of the automobile as shown in Fig. 1 and is illustrated with parts broken away at the rear of the machine to show the canopy arrangement beneath the seat.

Fig. 3 is a plan view of the top frame of the device.

Fig. 4 is a plan view of the top canopy and illustrates by dotted lines the manner in which it is folded prior to being rolled beneath the seat.

Fig. 5 is a view in vertical section as seen on the line 5—5 of Fig. 2 and illustrates the arched formation of the top when the canopy is in position.

Fig. 6 is a view illustrating one of the supporting uprights positioned at the rear of the automobile and further shows the disposition of the frame prior to being concealed within the automobile body.

Fig. 7 is a view in section through one of the frame cross bows and illustrates the collapsed and internested position of the members.

Referring to the drawings more particularly, 10 indicates an automobile which is composed of the customary running gear 11 upon which is mounted the body 12. The body is here shown as fitted with a front seat 13 and a rear seat 14. A wind-shield 15 is mounted in its usual position in front of the front seat. Referring particularly to Fig. 2, it will be seen that the seats are sheltered by a top 16 which extends from the upper edge of the wind-shield frame rearwardly to a point above the back of the seat 14. Upright members 17 are provided adjacent the rear end of the top 16 to support it upon the body.

The top 16 is formed with a collapsible frame portion 18 and a canopy 19 adapted to be stretched thereover when the frame is in its sheltering position over the automobile. Referring particularly to the frame construction as disclosed in Fig. 3 of the drawings, it will be seen that a series of parallel transversely disposed rib members 20, 21, 22 and 23 are provided and extend across the frame, the ends of the ribs being curved downwardly. The rib members are composed of I-beams, as shown in Fig. 7. A rear bow 24 is formed and extends the width of the frame at its rear end and is curved horizontally to match the rib 20—23. The ends of the transverse ribs are connected by a collapsible frame construction 25 which is formed similar to that of a pair of lazy tongs, that is, these frame portions are built up of a series of frame members 26 which cross each other and are pivoted at their centers, their outer ends being hinged together by suitable pins. The collapsible frame portions 25 and ribs 20—23 are formed arcuately as indicated in Fig. 5 of the drawings in order to give the top a downward curve along its opposite sides as is customary in top design. A centrally disposed collapsible portion 27 is secured to the transverse ribs and acts in a similar manner to that of the side frame members.

It is, however, formed of but four members which lie between and are secured to adjacent pairs of the transverse ribs. The front end of the extended top rests upon the windshield 15. It will thus be seen that the frame may be folded by forcing it backwardly toward the upright members 17 and it will there gather in a folded position. A pivot pin 28 is provided each upright 17 to secure the collapsible frame portion and to allow it to swing over the upright and downwardly within the arc of the rear member 24. A latch 29 is mounted upon the body of the automobile and is adapted to engage a slot 30 formed within the face of the upright members 17. This latch, when released from the upright, will allow it to telescope within a guide sleeve 31 and cause the folded frame to be disposed in a compartment 32 formed in the rear of the seat 14. A suitable cover is provided for the compartment 32 to conceal the frame when it is disposed therein.

The canopy 19 is adapted to be stretched over the frame portion and is particularly shown in Fig. 4 of the drawings. In this view it will be seen that it is formed with a central panel 33 secured at one end to the frame bow 20, and a pair of opposite side portions 34 and 35 which are adapted to be positioned over the arcuate frame members 25 and thus form the overhang at the sides of the top. A flap 36 is formed integral with the central panel 33 and at one end thereof. This portion is shaped to conform to the bow member 24 at the rear of the vehicle and to provide a flap which will hang down to inclose the space between the uprights at the rear of the automobile body. The lower end of the flap portion 36 extends downwardly into the compartment 32 previously designated as being formed to accommodate the folded frame 18. A pair of longitudinally extending parallel roller members 37 and 38 are secured within the compartment 32 and guide the fabric canopy as it is drawn beneath the seat and wound upon a curtain roller 39, the roller being rotated by a coil spring similar in its action to most curtain roller springs.

When the shelter of the automobile top is desired over the seats 13 and 14, the upright members 17 are raised from their concealed position within the compartment 32 and are locked by means of the catch 29. After the uprights have been suitably secured the folded frame is swung from its horizontally disposed position to the vertical one above and in front of the arcuate stay member 24. The frame is then drawn forward and in so doing the side members 25 and the central portion 27 will spread apart due to its lazy tongs formation. When the frame has been stretched until the stay 20 comes in contact with the frame of the windshield it is suitably secured by a convenient strap or other fastening means and a lock bar 40 which engages two of the cross bars and prevents their folding together. The frame portion, in stretching, has drawn the canopy over the supporting structure off the roller 39 over the guide rollers 37 and 38. The side flaps 34 and 35 are then swung outwardly and over the arcuately formed side members 25. A series of snap fasteners 41 are positioned along the marginal edge of each side and are adapted to engage fastening members 42 secured to the frame. The end flap 36 is next drawn around the bow and secured by means of additional snap fasteners similar to those along the sides. The top is now completely assembled.

In folding the top and placing it in its concealed position within the compartment 32 the previously described operation is reversed and the canopy as well as the frame therefor may be readily concealed without the removal of any of the parts from the automobile.

It will thus be seen that I have provided an automobile top which may be easily and simply folded and concealed from view when not needed and quickly assembled when required.

I claim:

In an automobile top, the combination with an automobile having vertical sockets at the rear of the sides of the rear seat, of uprights slidingly mounted in the sockets, means for holding the uprights in elevated position, a transverse rib connecting the upper ends of the uprights and pivotally mounted to swing from vertical position backwardly to horizontal position, lazy-tongs extending forwardly from the ends of the pivoted transverse rib, lazy-tongs extending forwardly from the intermediate portion of the pivoted transverse rib, and a plurality of transverse ribs connecting the lazy-tongs, the forward ends of the extended lazy-tongs being supported near the dash and there being a compartment behind the rear seat, and all of said transverse ribs being arched; so that when the lazy-tongs are collapsed the forward transverse ribs will stack up against the pivoted transverse rib and tilt backwardly upon the pivots, and when said means for holding said uprights are released, said uprights will go down carrying the collapsed top into the compartment behind the seat.

In testimony whereof I have signed my name to this specification.

LORA E. SHERMAN.

Copies of this patent may be obtained for five cents each, by addressing the "Commissioner of Patents, Washington, D. C."